July 1, 1930.  C. S. TEITSWORTH  1,769,475
METHOD OF RECONDITIONING SAND FILTERS
Filed Aug. 9, 1929
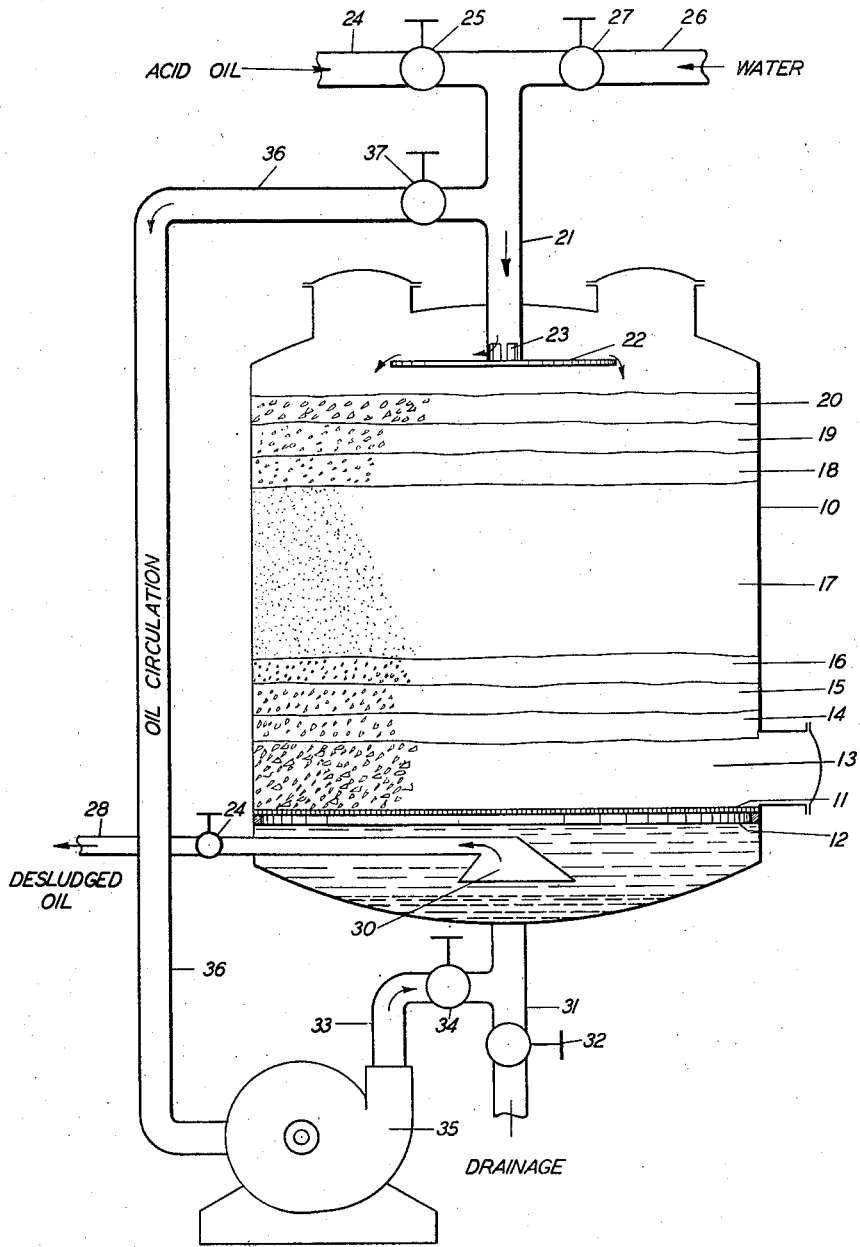
CLARK S. TEITSWORTH
INVENTOR
ATTORNEY Patented July 1, 1930

1,769,475

UNITED STATES PATENT OFFICE

CLARK S. TEITSWORTH, OF LOS ANGELES, CALIFORNIA, ASSIGNOR TO GENERAL PETROLEUM CORPORATION OF CALIFORNIA, A CORPORATION OF DELAWARE

METHOD OF RECONDITIONING SAND FILTERS

Application filed August 9, 1929. Serial No. 384,752.

My invention pertains to the art of refining petroleum oils with sulfuric acid, to the removal of the acid sludge from the oil by means of sand filters, and specifically to a method by which such filters, when they have become choked with sludge, may be brought back into condition for use without removing the sand from the filtering bed.

Light petroleum products, such as gasoline and kerosene, are usually purified by vigorous agitation with strong sulfuric acid, the reaction of the acid with certain impurities in the oil producing an acid sludge which retains small quantities of free sulfuric acid and also contains much greater proportions of various reaction products of an acid nature. This sludge is much more viscid and sticky than the original acid. As produced by the agitation above referred to a portion of this sludge is present in the treated oil in a state of extreme subdivision. On standing, the coarser particles of sludge settle from the oil but the finer portions, which may be present in the form of a dark colored cloud consisting of microscopic particles, strongly resists settling.

Most acid sludges are of such nature that when they are brought into contact with alkali solutions or even with water the acid constituents are split off and a bituminous residue remains. This residue is of a black color and has high tinctorial value, and as it is quite readily soluble in the oil (which the original sludge is not) the addition of water or aqueous solutions to an oil containing sludge is highly detrimental to the color and the purity of the finished product. For this reason the washing of acid treated oils with water or with aqueous solutions is usually avoided, or is delayed until after the substantially complete removal of the sludge from the oil by a different treatment.

The purpose of the sand filter in a treatment of this nature is to remove from the acid oil such of the finer sludge particles as fail to settle out. On passing a stream of oil containing such minute particles through a bed composed of finely divided and non-reactive mineral fragments (of which clean sand is the best example) the surfaces of the fragments or grains are preferentially wetted by the sludge, which is thus withdrawn from the oil stream. The sand grains gradually become coated with sludge and, if the operation be not too long continued, the effluent oil stream is practically free from sludge and from suspended acids. In such condition its content of dissolved acidity may be neutralized with impunity by a wet treatment.

It will be obvious that if this operation could be continued long enough the interstices between the sand grains would become choked with viscid sludge and the permeability of the filter bed would be destroyed. However, the filter passes out of function long before this stage is reached for the reason that, once completely coated with sludge, the sand grains no longer have the power to lay hold of and retain further sludge particles, which thus pass through the filter with the oil. When this stage is reached the sand grains must be cleaned by having the sludge layers removed from their surfaces and it is to this cleaning operation that my present invention is directed.

It has heretofore been known that sand filters used in the manner above described may be cleaned by first washing out a portion of the sludge with water, then thoroughly steaming to remove the remainder of the sludge and, finally, blowing with air until the water thus distributed throughout the pack is removed by evaporation. The water wash removes sludge mechanically entrained and also hydrolyzes the sludge attached to the sand grains, rendering it oil soluble, which the original sludge is not. The steam treatment partly displaces and partly evaporates the hydrolyzed sludge but leaves a bituminous residue which is not removed by the final air drying.

This prior art method of reconditioning is quite effective and may be used to restore the sand bed an indefinite number of times, but has obvious disadvantages. It is slow and tedious, and quite expensive because it consumes large quantities of water, steam and compressed air. It always leaves behind a material quantity of oil soluble hydrolyzed sludge which acts to discolor a large quantity of the first runnings from the reconditioned filter. And not least, the violent agitation with air causes heating and the evolution of sparks from the sand bed, thus incurring a serious fire hazard in a refinery handling volatile and inflammable materials.

I have discovered that the water remaining in the filter after the water wash as well as the remainders of hydrolyzed and oil soluble sludge may be removed in a much simpler and cheaper manner, by taking advantage of the oil solubility of the hydrolyzed sludge. In this process, filtration of sludge containing oil having been carried to its limit and the sand grains being coated with sludge, I displace any mechanically entrained sludge and hydrolyze such portions as remain in the form of coatings on the sand grains by passing through the filter a relatively small quantity of water. I then drain the filter to remove free water, and as a final step, circulate through the filter one or more small doses of the oil to be filtered or of an oil of similar characteristics.

The detailed manner of applying my invention may best be explained with reference to the attached drawing, in which 10 is a vertical steel shell, preferably cylindrical, having a grid 11 resting on a ring 12 which is made fast to the shell. On this grid rests a stratified layer of permeable material, which for example may be composed of the following layers: 13 of broken rock of about ½" mesh; 14 of rock or gravel of about ¼" mesh; 15 of ⅛" grit; 16 of 16 mesh sand; 17 of 20/40 mesh sand; 18 of ⅛" grit; 19 of ¼" rock or gravel and 20 of ½" broken rock. Layer 17 may be perhaps two feet thick, the other layers from 2" to 4" each.

It will be understood that this arrangement of layers is illustrative only and that my invention is not limited to any particular size or order of granular materials.

Through the top of the shell I introduce a pipe 21 closed at its end by the spreader plate 22, such liquids as pass through the pipe issuing on top of the plate through ports 23. This pipe communicates with a pipe 24 controlled by valve 25 and with a pipe 26 controlled by valve 27. One of these branch pipes is connected with a source of supply of acid oil under pressure, the other with a source of supply of wash water.

Through the wall of the shell at any point below the grid 11 I introduce a pipe 28 controlled by a valve 29 and having at its inner end a downward looking funnel or shield 30. This pipe is used for withdrawing filtered oil from below the pack, the shield acting to prevent any particles of sludge which may become detached from the sand from entering the pipe.

From the bottom of the shell I make a pipe connection 31 controlled by a valve 32, this valve being used to drain out any sludge which may accumulate on the bottom during the filtering operation and also as a water drain during the washing operation.

From pipe 31 a branch pipe 33 controlled by a valve 34 connects with the discharge end a pump 35 and from the suction end of this pump a pipe 36 controlled by a valve 37 is connected into pipe 21, thus forming a bypass around the filter. This bypass is used for circulating oil through the filter after the washing operation. The direction of this circulation is optional.

In using this apparatus I proceed in the following manner. All the valves except 25 and 29 being closed I pass gasoline or other oil containing sludge through the filter pack until the effluent oil is no longer sufficiently desludged. I then close valve 25 and allow the pack to drain substantially free from oil. While filtering, valve 32 may be slightly opened at intervals to withdraw any sludge which may collect on the bottom of the shell.

When the filtering stage is completed and the filter drained I open valve 32, close valve 29 and admit a flow of water by opening valve 27. Water is allowed to pass through the sand bed until it comes through substantially colorless and free from traces of sulfuric acid and suspended sludge. Unless the sludge is very viscid only a relatively small quantity of water is required, inasmuch as it is preferable to flow it through at a low velocity, but time enough must be allowed to complete the hydrolysis of the remaining sludge or the next step in the reconditioning operation will not function. When the filter is sufficiently washed valve 27 is closed and the filter allowed to drain completely, after which valve 32 is closed.

The next step is to displace any remaining water from the filter and to dry the sand by dissolving the hydrolyzed sludge from the grains, thus leaving them coated with oil. To this end I open the circulation valves 34 and 37 and fill the filter with acid oil by opening valve 25. I then start pump 35 and circulate the oil through the filter and back through the pump. It is desirable to maintain circulation at somewhere about the velocity with which the oil passes through the filter during the filtering operation, though this is not essential, and again it is desirable to circulate in the direction shown though good results may be had by circulating downward instead of upward.

The circulation of oil through the sand bed produces a double effect. The water retained in the bed after draining is mechanically displaced and brought into suspension in the oil, and the coatings of oil soluble hydrolyzed sludge retained by the sand grains are dissolved and the grains are left coated with oil. This solution of sludge requires time and I prefer to circulate a single dose of oil for perhaps eight hours. It is not necessary that circulation be strictly continuous, but the oil should be moved at frequent intervals to present fresh oil to the sand grains and thus aid the solution of the sludge and also to prevent the accumulation of water pockets in the sand bed.

When the oil has taken up as much tar as it will dissolve the circulation is interrupted, valve 25 closed and the filter drained. The drawing shows an open drain through which the oil would be wasted, but though the oil thus withdrawn is thoroughly degraded, containing a material proportion of sludge as well as of water, it may be recovered by returning it to the raw stock for retreatment.

Draining off the first dose of oil leaves always some oil entrapped in the sand and saturated with sludge. The filter is therefore refilled with fresh oil and the above operation repeated until the oil comes through substantially white and free from water. This usually requires three doses of oil, each being drained after circulation. As the filter is substantially filled with solid material the total quantity of oil thus debased in quality is extremely small.

The filter is now completely reconditioned and ready to deliver sludge free and water white oil when fed with sludge containing oil, as when first charged.

It should be noted that while the filter is dried and reconditioned by the use of the same acid oil which is to be filtered, the above operation is in no wise equivalent to feeding a flow stream of acid oil through the filter until the dried condition is reached. If this is attempted it will be found that the first runnings are off color and acid, and this condition will persist for so long a time that a very large amount of oil of degraded quality will be delivered by the filter. The removal of the water and the solution of the hydrolyzed tar requires time rather than quantity of oil. By following the above instructions the quantity of oil consumed or degraded in reconditioning the filter is reduced to a fraction of the quantity which would be required if the oil were flowed through continuously, and to a very minute proportion of the quantity which may be desludged before another cleaning of the filter is required.

While I do not recommend the practice, it is a partial equivalent of the method above described to omit the circulation and to merely fill the drained filter with oil, allow it to soak for several hours, draw down the oil and accompanying water, and repeat until clean. This practice will substantially dry the filter but will leave some bituminous matter to contaminate subsequently filtered oil and will require at least twice as much soaking oil as the preferred method above described.

While I prefer to use for the displacement of the water, as above described, a portion of the acid oil which is to be filtered (this being the simplest and most economical procedure) I may also use for this purpose any other oil which may be intermixed in small proportions with the filtered oil without damage to its properties. Such alternative oils are: the original oil after filtration, or after complete finishing, or an oil from another source provided it has the same general characteristic as the oil to be filtered. The term "oil" used in the appended claims is intended to embrace and to be lmited to the description immediately above.

I claim as my invention:

1. The method of reconditioning a filter containing sand contaminated with acid sludge from a previous desludging operation, which comprises: displacing sludge from said sand and hydrolyzing a remainder of sludge by applying water to said sand, and displacing said water from said sand and dissolving said hydrolyzed sludge by applying oil to said sand.

2. The method of reconditioning a filter containing sand contaminated with acid sludge from a previous desludging operation, which comprises: displacing a portion of said sludge from said sand by passing water therethrough, the remainder of said sludge being thereby hydrolyzed; draining water from said filter, and displacing a remainder of water from said sand and dissolving said hydrolized sludge by contacting oil with said sand.

3. The method of reconditioning a filter containing sand contaminated with acid sludge from a previous desludging operation, which comprises: displacing a portion of said sludge from said sand and simultaneously hydrolyzing the remainder of said sludge by passing water through said sand; draining water from said filter; displacing a remainder of water and dissolving said hydrolyzed sludge from said sand by circulating oil therethrough, and draining the circulated oil and bodies contained therein from said filter.

4. The method of reconditioning a filter containing sand contaminated with acid sludge from a previous desludging operation, which comprises: displacing a portion of said sludge from said sand and simultaneously hydrolyzing the remainder of said sludge by passing water through said sand; draining water from said filter; displacing water and dissolving hydrolyzed sludge from said sand by circulating oil therethrough; draining the circulated oil and bodies contained therein from said filter, and repeating said circulation and last said drainage until said water and said hydrolyzed sludge are substantially removed from said sand.

5. The method of reconditioning a filter bed contaminated with acid sludge which comprises: displacing a portion of said sludge from said bed by passing water therethrough, the remainder of said sludge being thereby hydrolyzed; draining water from said bed, and displacing a remainder of water and dissolving said hydrolyzed sludge from said bed by passing oil therethrough.

In witness that I claim the foregoing I have hereunto subscribed my name this 15th day of July, 1929.

CLARK S. TEITSWORTH.